No. 654,220. Patented July 24, 1900.
D. BOTHWELL.
MILK COOLER.
(Application filed Oct. 6, 1899.)
(No Model.)

WITNESSES:
C. C. Schorneck
M. M. Nott

INVENTOR
David Bothwell
BY
Smith & Dennison
ATTORNEYS.

THE NORRIS PETERS CO., PHOTO-LITHO., WASHINGTON, D. C.

UNITED STATES PATENT OFFICE.

DAVID BOTHWELL, OF HANNIBAL, NEW YORK, ASSIGNOR TO MARIA A. BOTHWELL, OF SAME PLACE.

MILK-COOLER.

SPECIFICATION forming part of Letters Patent No. 654,220, dated July 24, 1900.

Application filed October 6, 1899. Serial No. 732,790. (No model.)

*To all whom it may concern:*

Be it known that I, DAVID BOTHWELL, of Hannibal, in the county of Oswego, in the State of New York, have invented new and useful Improvements in Milk-Coolers, of which the following, taken in connection with the accompanying drawings, is a full, clear, and exact description.

This invention relates to improvements in milk-coolers.

My object is to produce a milk-cooler which is adapted to cool the milk by supporting within the can a receptacle through which cold water is allowed to pass and at the same time so arrange it that the milk when it is poured into the can will first flow or trickle along and down the outer and cool walls of the cooling device, at the same time providing means at the lower end of the can for drawing off the milk to prevent it from whirlpooling at the bottom, thereby obviating suction, which draws the dirt and other foreign substances out with the milk, but allows the milk to be drawn out evenly and gradually and deposit the foreign substances upon the bottom of the can; and to that end my invention consists in the several new and novel features of construction and operation, which are hereinafter described, and specifically set forth in the claims hereunto annexed. It is constructed as follows, reference being had to the accompanying drawings, in which—

Figures 1, 2:
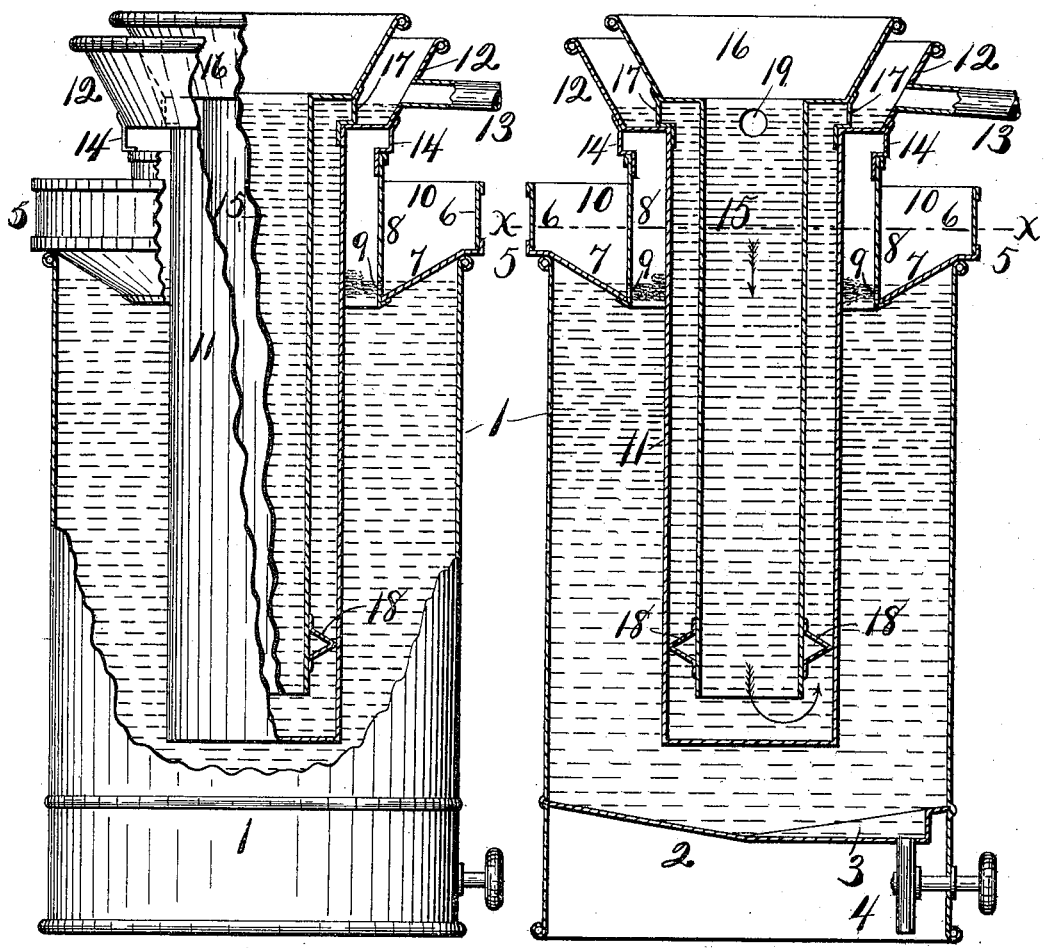
Figure 3:
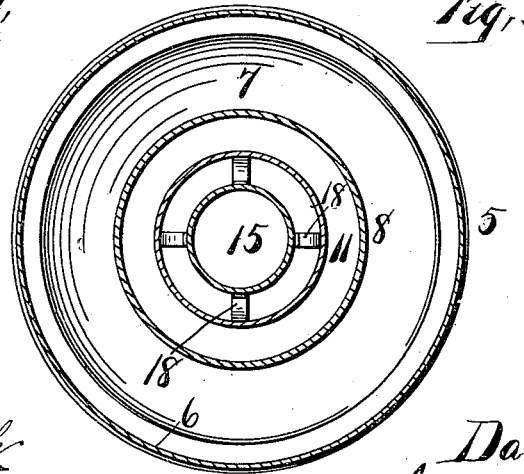

Figure 1 shows a side view of the cooler complete, a portion of the shell of the can and the shells of the cooling device being broken away. Fig. 2 shows a vertical section. Fig. 3 is a cross-section on line $x$ $x$ in Fig. 2.

Similar numerals of reference indicate corresponding parts.

1 is a milk-can constructed substantially as shown and having a concaved bottom 2, said bottom being provided with a narrow channel 3, extending from the center of the can radially and terminating in an outlet-pipe 4, which pipe is provided with a faucet operated in any ordinary well-known manner.

The object in providing the radial channel 3 is for the purpose of allowing the milk to be drawn off gradually and obviate its forming a pool in the center, and thereby draw down the dust and dirt and other foreign substances which congregate upon the top of the milk.

5 is a cover comprising an outer rim 6, a concaved bottom 7, extending to the upright cylinder 8 and forming a trough into which the milk is poured, and 9 represents perforations in the cylinder 8 just above the point where it is secured to the bottom 7, and through which perforations the milk in the trough 10 shoots inwardly and strikes the outer face of the cooling-chamber 11.

The cooling device comprises the cylinder or outer case 11, enlarged at its upper end, as shown at 12, and provided upon one side with an outlet 13, all constructed substantially as shown, and provided with legs 14, which rest upon the top of the cylinder 8 in the cover. The body 11 has a closed bottom, as shown.

15 is the inner cylinder or member of the cooling device, open at its bottom and terminating in an enlarged top 16, and 17 represents feet or brackets, secured as shown, and adapted to rest upon the upper portion of the outer member or body 11, so as to support the inner body within the outer body, and 18 represents lugs or arms to hold it in position substantially in the center of the body, as shown. 19 is an opening in the inner body, the operation of which is hereinafter described.

To operate my device in cases where I desire to use it for cooling milk by running water, I set the cooling device in the can, as above described, and allow the running water to pass down through the body 15 and up through the outer can or body 11 and then out through the outlet 13, thereby cooling the walls of the outer body 11 and keeping them cool. I then pour the milk into the trough 10, and as it spurts out through the openings 9 it strikes the outer wall of the body 11, causing it to be cooled almost immediately.

In the event I desire to use the cooling device where running water is not at hand, I place cold water in a receptacle, and as the water becomes warm adjacent to the walls it is allowed to circulate in the cylinder or body 15 through the opening 19.

Having described my invention, what I claim, and desire to secure by Letters Patent, is—

1. A milk-cooler comprising a body having an outlet, and a cylinder open at both ends suspended therein, said cylinder being provided with an opening for the purposes set forth.

2. A milk-cooler, comprising a can, provided with a cover having an annular trough, perforations at the bottom of said trough, and a cooling device suspended in said can, and against which the milk is adapted to come in contact, as it passes through said perforations.

In witness whereof I have hereunto set my hand this 30th day of August, 1899.

DAVID BOTHWELL.

Witnesses:
 D. D. METCALF,
 C. F. RICH.